June 23, 1959   B. D. MENKIN ET AL   2,891,364
MACHINE FOR MAKING FLAVORED DRINKING STRAWS
Original Filed April 23, 1956   7 Sheets-Sheet 1

BENJAMIN D. MENKIN,
STANLEY F. RABIN &
MARTIN D. SCISOREK,
INVENTORS.

BY Pennie, Edmonds, Morton, Barrows and Taylor
ATTORNEYS.

BENJAMIN D. MENKIN,
STANLEY F. RABIN &
MARTIN D. SCISOREK,
INVENTORS.

BY Pennie, Edmonds, Morton, Barrows and Taylor
ATTORNEYS.

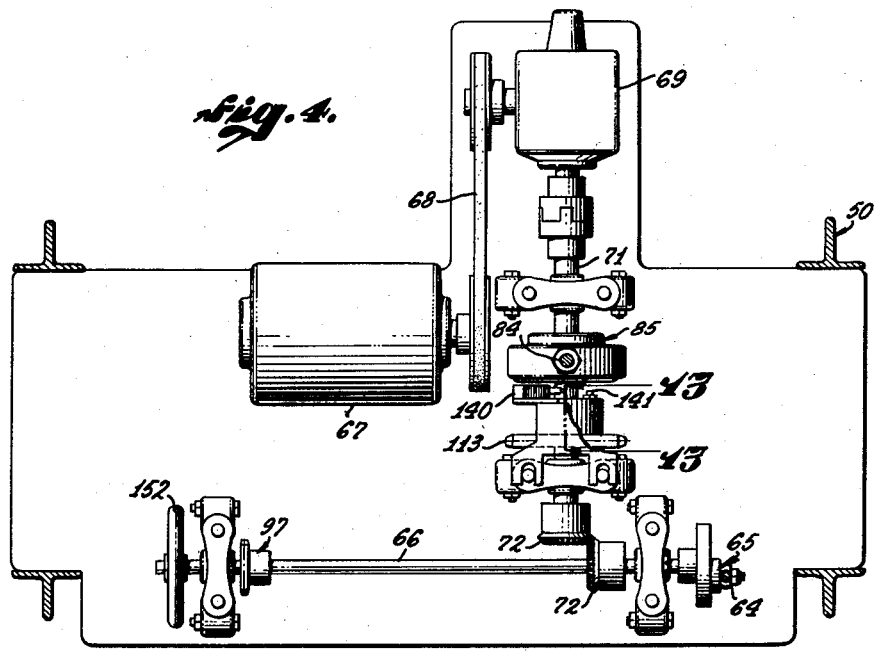
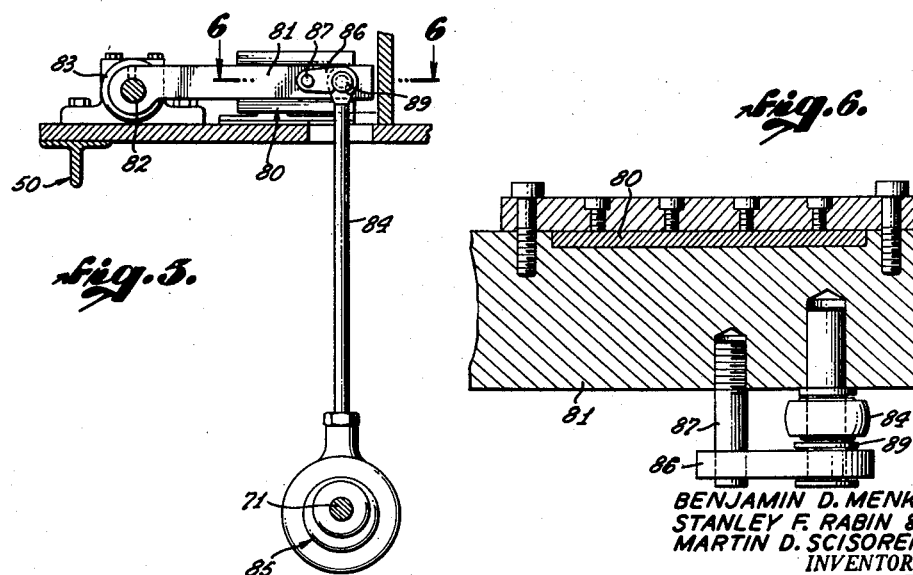

June 23, 1959   B. D. MENKIN ET AL   2,891,364
MACHINE FOR MAKING FLAVORED DRINKING STRAWS
Original Filed April 23, 1956   7 Sheets-Sheet 5
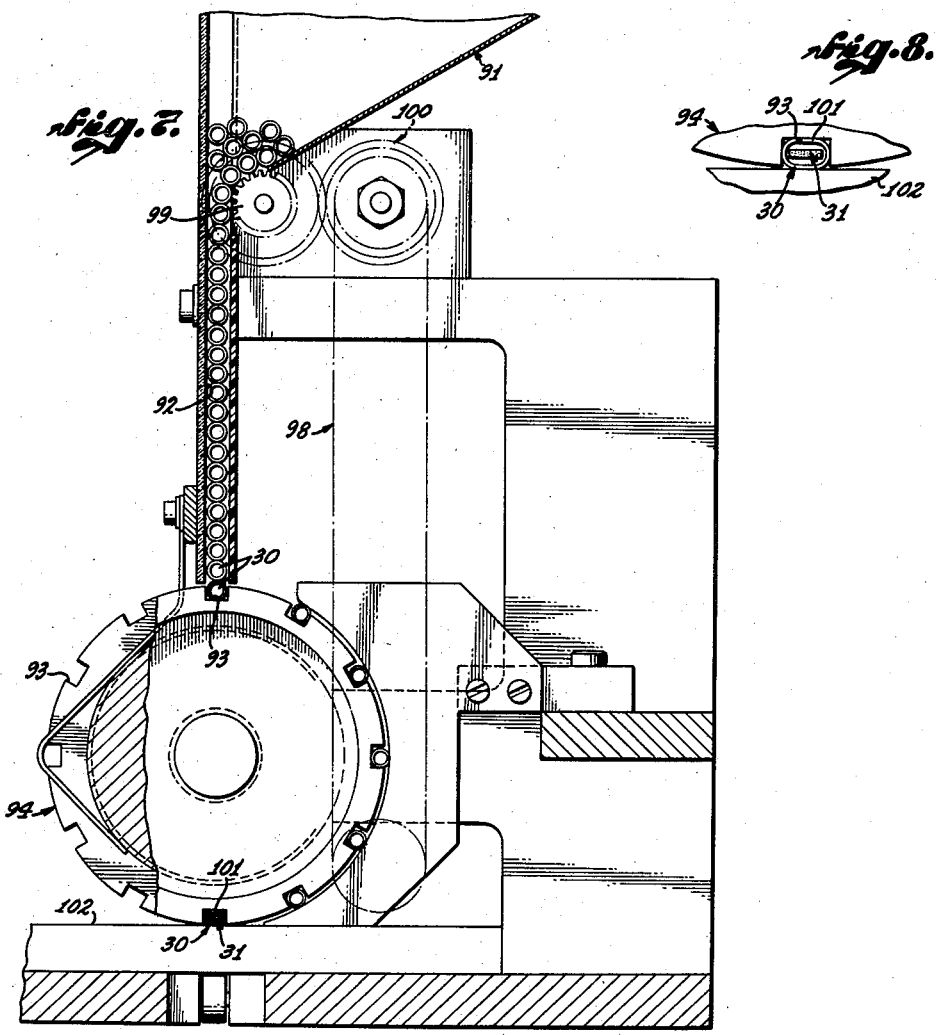
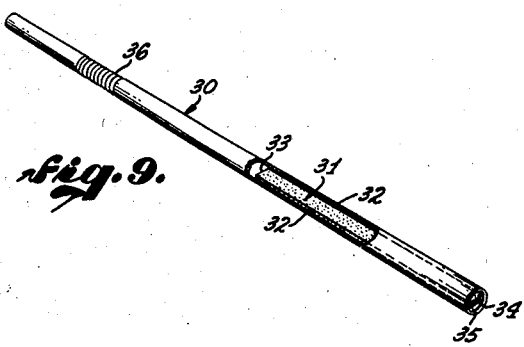
BENJAMIN D. MENKIN,
STANLEY F. RABIN &
MARTIN D. SCISOREK,
INVENTORS.
Pennie, Edmonds, Morton,
Barrows and Taylor
BY   ATTORNEYS.

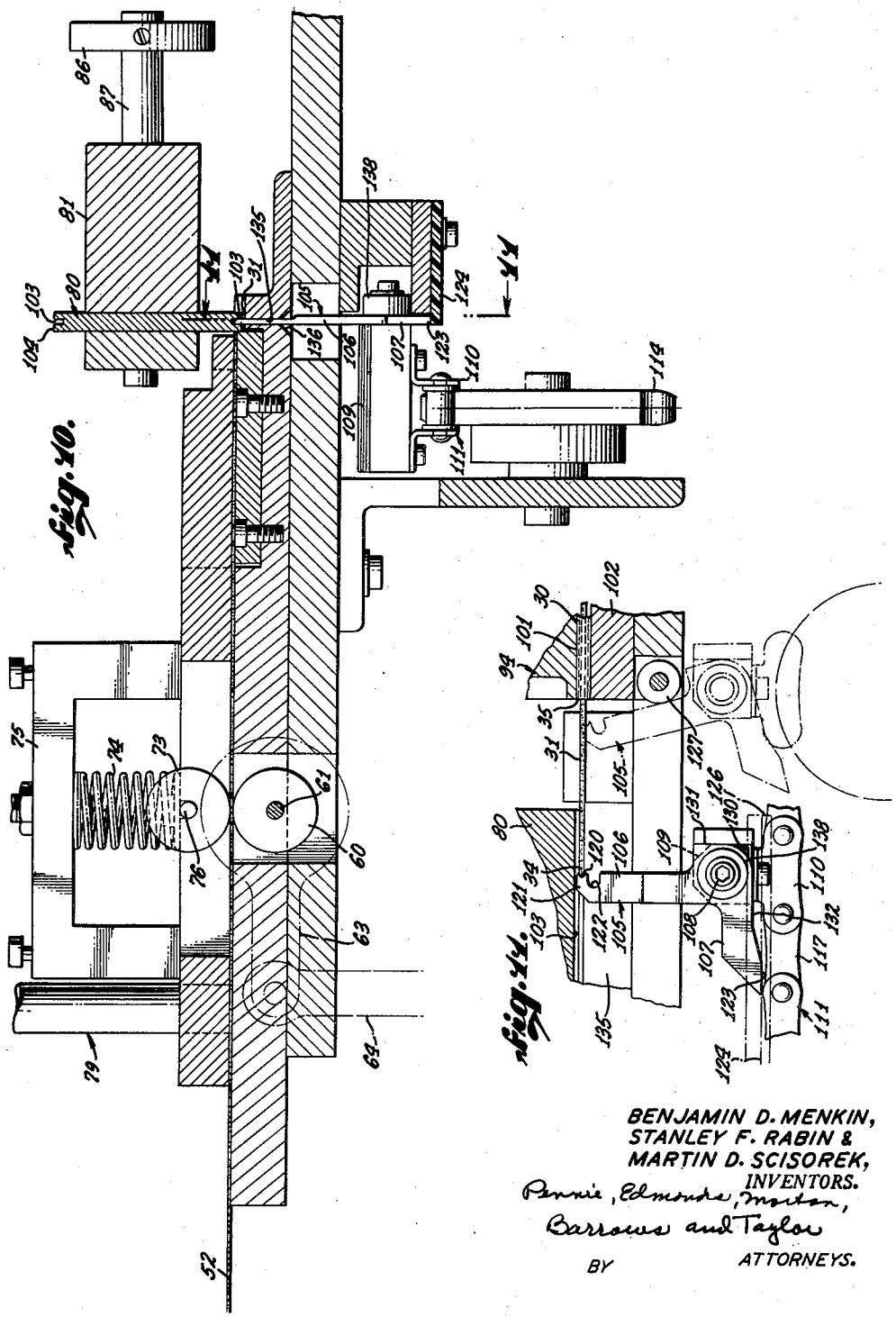

June 23, 1959   B. D. MENKIN ET AL   2,891,364
MACHINE FOR MAKING FLAVORED DRINKING STRAWS
Original Filed April 23, 1956   7 Sheets-Sheet 7
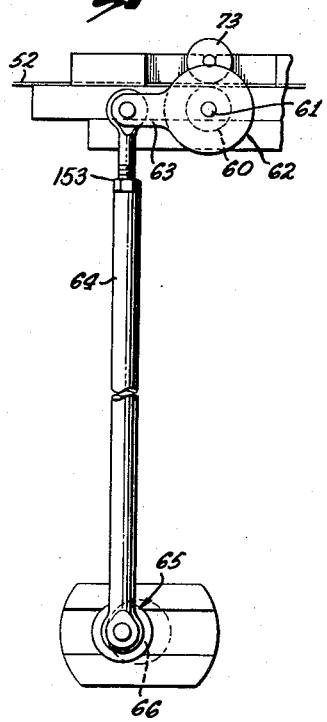
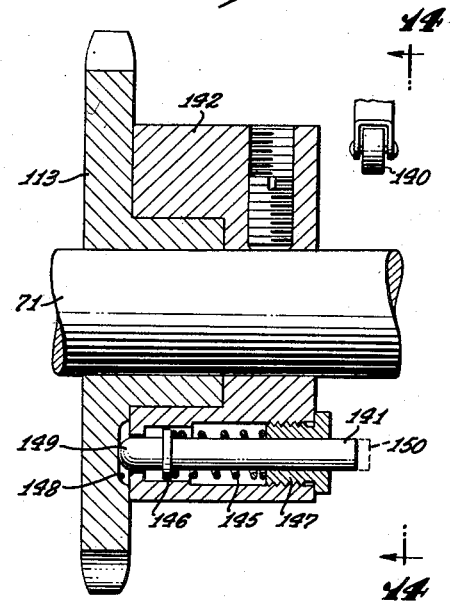
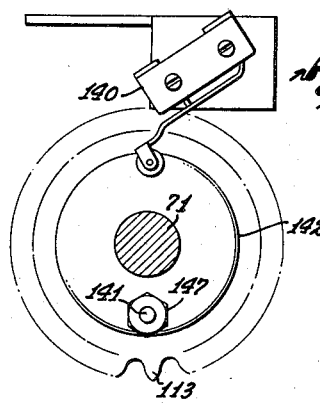
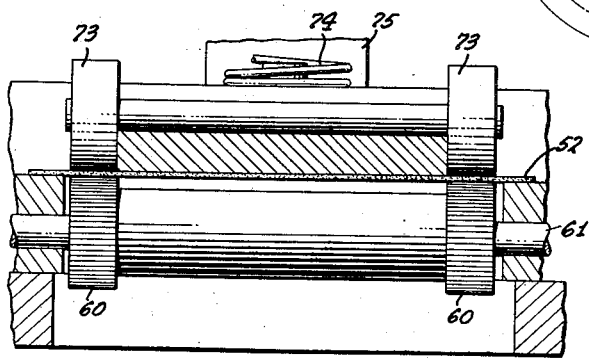
BENJAMIN D. MENKIN,
STANLEY F. RABIN &
MARTIN D. SCISOREK,
INVENTORS.
BY   ATTORNEYS.

United States Patent Office 2,891,364
Patented June 23, 1959

2,891,364

MACHINE FOR MAKING FLAVORED DRINKING STRAWS

Benjamin D. Menkin, Los Angeles, Stanley F. Rabin, Sepulveda, and Martin D. Scisorek, North Hollywood, Calif., assignors to Jere Bayard, Stanley F. Rabin, and Martin D. Scisorek Original application April 23, 1956, Serial No. 580,027, now Patent No. 2,846,313, dated August 12, 1958. Divided and this application January 22, 1958, Serial No. 710,580

15 Claims. (Cl. 53—123)

This invention relates to a machine for making flavored drinking straws, and particularly to a machine for inserting a flavoring insert or strip into a drinking straw to be held therein by frictional means, so that the insert may flavor a drink passing through the straw while resisting dislodgment with sufficient force to prevent displacement or loss during normal use of the straw while sipping fluid therethrough in the customary manner.

It is an object of this invention to provide a machine capable of rapidly and economically inserting the flavored element into a drinking straw in a commercially satisfactory manner.

More specifically, it is an object of this invention to provide new and improved, rapidly operating finger means for inserting the flavoring strip into the straw, to provide new and improved means for supplying, feeding and introducing the flavoring strips to said finger means, to provide releasable means for rapidly and effectively stopping the operation of the finger means in the event of an interruption in the smooth insertion of the flavoring strips into the straws, and to provide new and improved means for handling the flavoring strips, including means for facilitating their insertion into the open ends of the straws, and means for manually or selectively stopping the feeding of said flavoring strips.

Other and further objects and purposes will appear from the instant following description, taken alone or in combination with the drawings and the claims.

Figure 1:
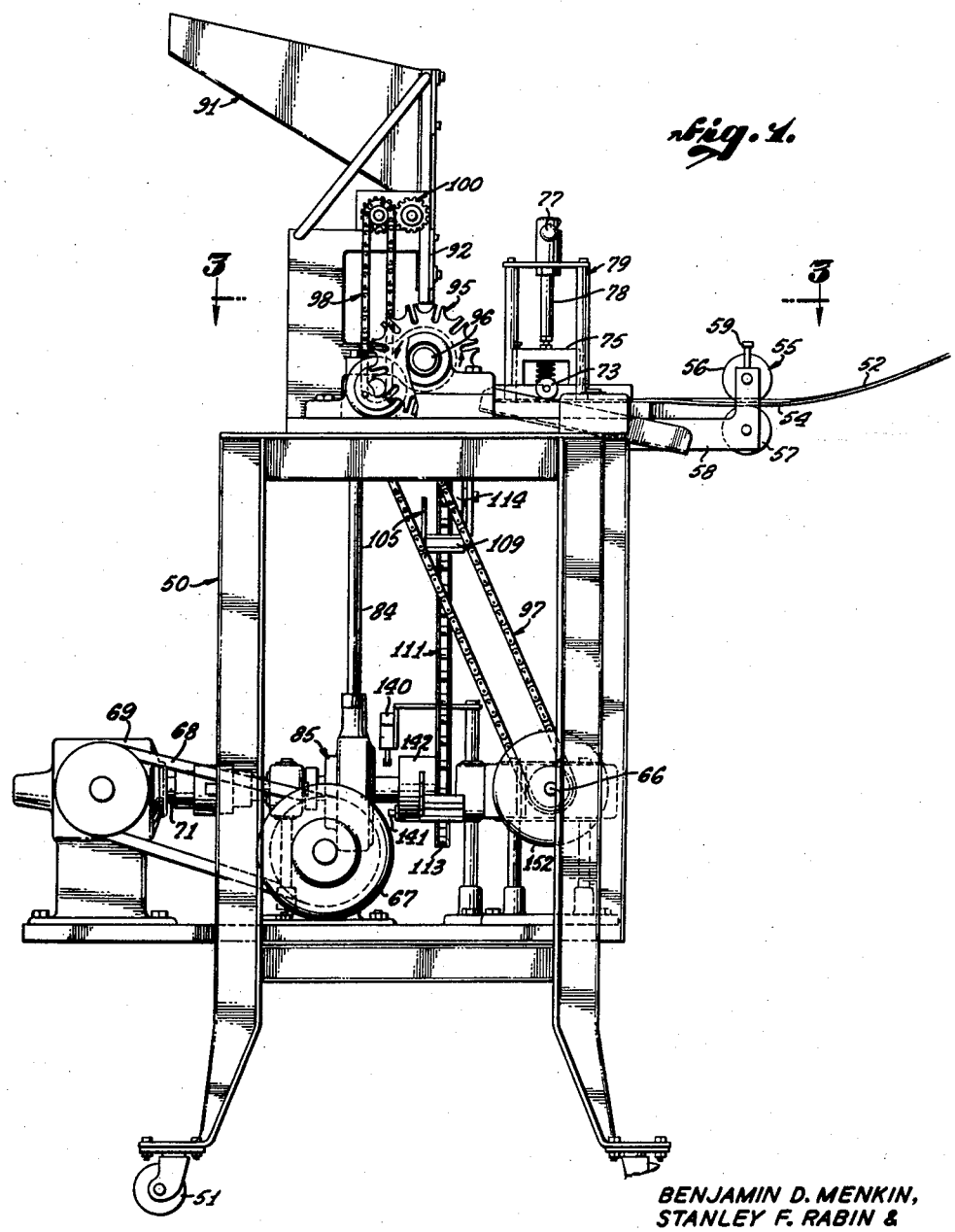
Fig. 1 is a side view of a machine embodying this invention.
Figure 2:
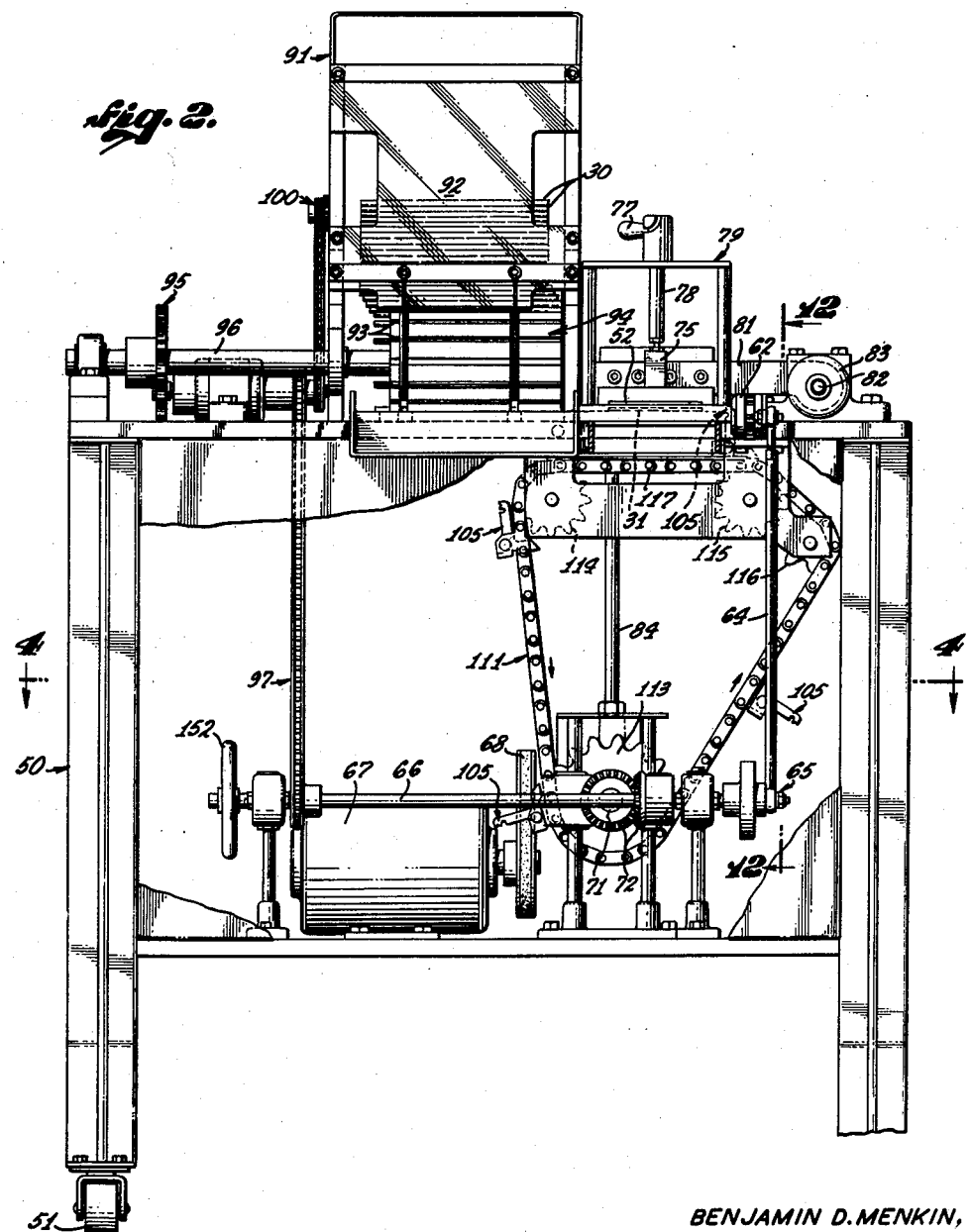
Fig. 2 is a front elevational view taken as from the right hand side of Fig. 1.
Figure 3:
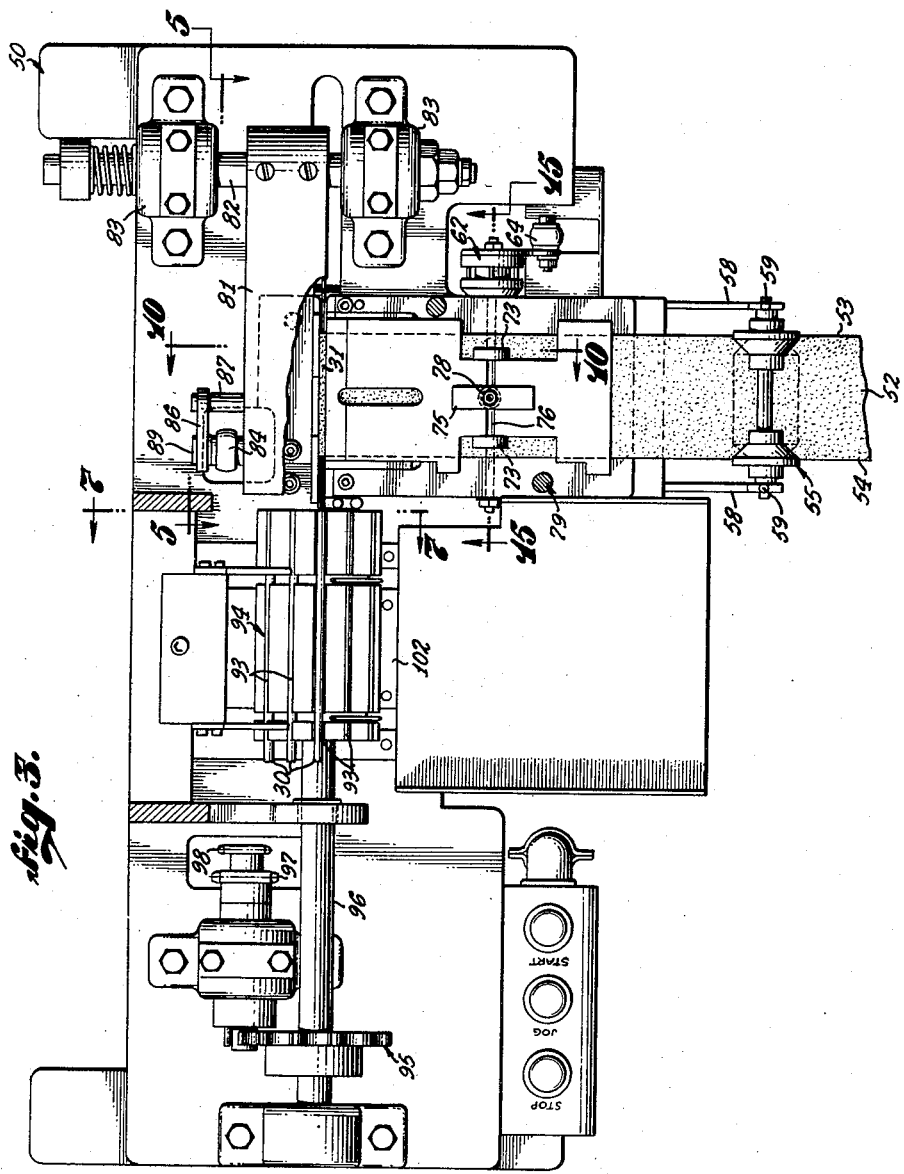

Fig. 3 is a top view of said machine, parts being cut away, taken as on a line 3—3 of Fig. 1, Fig. 4 is a plan sectional view taken as on a line 4—4 of Fig. 2, Fig. 5 is a vertical sectional view taken as on a line 5—5 of Fig. 3, Fig. 6 is an enlarged detailed view in section taken as on a line 6—6 of Fig. 5, Fig. 7 is an enlarged detailed sectional view taken as on line 7—7 of Fig. 3, Fig. 8 is a detailed fragmentary sectional view of a portion of Fig. 7, enlarged, Fig. 9 is a perspective view of a straw and insert made with the machine of this invention, Fig. 10 is an enlarged detailed sectional view taken as on a line 10—10 of Fig. 3, Fig. 11 is a fragmentary sectional view taken as on a line 11—11 of Fig. 10, Fig. 12 is a sectional view taken as on a line 12—12 of Fig. 2, Fig. 13 is a sectional enlarged view on a line 13—13 of Fig. 4, Fig. 14 is a sectional view as on a line 14—14 of Fig. 13, and Fig. 15 is an enlarged detailed sectional view as on a line 15—15 of Fig. 3.

In referring more particularly to the drawings, Fig. 9 shows a drinking straw 30 having the flavoring insert therein, such as is produced by the machine of the invention. This insert may be of any desired flexible material, such as fiber, paper, cardboard, or the like. The term flexible as herein used refers to the flexibility of the wall of the straw to permit distortion thereof to facilitate the ready insertion of an insert strip 31 during manufacture, said wall of the straw being flexible in the sense that after distortion, it will return to its normal or undistorted position to frictionally hold or engage the side edges of the insert 31, and thereby retain the insert in the straw.

Insert 31, in the form illustrated in the Fig. 9, has opposed substantially parallel side edges 32, an inner end 33 and an outer end 34. The straw may be formed with circumferential grooves, such as 36, to enable ready bending of this portion of the straw, and also if desired, to provide a stop to prevent the insert from entering the straw beyond a predetermined extent.

A preferred material for the insert 31 is pure cotton linter, preferably this material is pressed in the form of a board similar to a blotter, and is impregnated with any suitable flavoring material adapted to the drink which it is intended will be sipped through the straw.

Referring now to the machine of the invention, whose function it is to feed and insert the flavored inserts 31 into the straws 30, the same comprises a frame 50 optionally mounted as on casters 51. Details of the machine's construction will be pointed out in connection with its mode of operation, as follows:

An elongate strip of a material comprising 100% cotton linters is fed into the machine from a roll and roller support not shown.

In order to give the strip a desired lateral contour to facilitate its later insertion into the straw by means to be described, it has been found advantageous to curl or force the opposite edges 53 and 54 of the feed stock or strip 52. This is accomplished by passing the same through a feed roller means 55 comprising opposed upper and lower rollers 56 and 57 respectively, on each side of the feed strip 52. The rollers 56 and 57 are mounted as on any suitable spring member 58. The upper rollers 56, for example, are tapered inwardly and the lower rollers 57 tapered outwardly. Any suitable adjustment means or screws such as 59 are adapted to bring the respective rollers 56 and 57 into any desired degree of operative proximity so as to grip the edges 53 and 54 of the feed strip 52 to give them the desired flexure and set.

Driven feed rollers 60 are keyed to a shaft 61 journally mounted in the frame and driven by a clutch means 62, the latter being driven by an arm 63 pivotally connected to a link 64 having an eccentric connection 65 on a drive shaft 66 normally rotated as through a motor 67, pulley drive 68 and speed control means 69, making preferred releasable connection with said shaft 66 through another drive shaft 71 having a driving connection with said first drive shaft 66 as through bevel gears 72.

Upon each rotation of the shaft 66, the feed rollers 60, which are preferably narrowed, will be given an intermittent partial rotation so that through their frictional engagement with the feed strip 52 and the cooperative action of the idler feed rollers 73, said feed stock 52 will be moved into the machine to a predetermined extent.

In the event of jamming of the feed stock or its desired replacement, the idler feed rollers 73 are mounted under spring tension by means of a coil spring 74. A yoke 75 normally holding the spring 74 in compression against a shaft 76 of the idler roller is releasable to a handle 77 and a related control rod 78 mounted in an auxiliary frame 79. Thus, it may be observed that upon rotating the handle 77 counterclockwise, the frame tension on the rollers 75 will be relieved bringing the stock 52 from its normal pinched and driven engagement between the feed rollers 60 and 73. The extent of movement of the feed stock 52 effected by each intermittent actuation of the driven feed roller 60 is adjustable by threaded connection 153 on the link 64.

As the stock 52 is fed into the machine through the aforementioned roller system, it is intermittently sheared by a knife 80, whose shearing action is synchronized with that of the feed rollers 60, mounted on an arm 81 having pivotal securement on a shaft 82 mounted in a bearing 83, supported on the frame 50. Said arm 81 is pivotally secured, preferably releasably, to an arm 84 having securement for intermittent longitudinal movement to an eccentric connection 85 keyed to the shaft 71. Said releasable securement to arms 81 and 84 is through a latch 86 pivotally secured at 87 to the arm 81 and releasably holding a shoulder pin 89 held in the arm 81 and making pivotal securement with said arm 84. By release of the latch 86, the arm 84 may be disconnected to the arm 81.

The descent of the knife 80 cuts off an insert 31 in the form of an elongate strip of said feed stock 52 corresponding to the width of the ribbon of such feed stock 52.

Simultaneously, straws are fed from a hopper 91 to a filling station with the straws in substantially longitudinal alignment and having a restricted throat portion 92 feeding the straws 30 into respective receiving slots 93 in a feed wheel 94 whose rotation is timed by a Geneva movement 95, operating on a common shaft 96 and driven through a sprocket chain drive 97 from the shaft 66. A supplemental chain and sprocket drive 98 operates an agitator 99 within the hopper 91 to keep the straws moving from the hopper into the throat 92. Said agitator derives its power from a shaft and gears 100 driven by said gear drives 97, 98 and said driven shaft 66. The intermittent movement occasioned by the Geneva device 95 brings the respective straws 30 in their corresponding slot 93 into alignment with the insert 91 as is most clearly shown in Figure 3. Inasmuch as the slotted wheel 94 moves, as illustrated most clearly in Figures 7 and 8, in a clockwise direction, as in said figures shown, the respective straws are intermittently arrested so that they are individually brought into such position of alignment in a preferred slightly flattened state, as illustrated at 101 in Figure 7. One of the straw bodies 30 is aligned with and oriented to receive insert 31. Such compression of the straw body, culminary to the receipt of the insert 31, is determined by the depth of the respective grooves or slots 93 on the straw feeding wheel 94 and the height of the bottom of such groove above the bed 102 or other surface provided on the frame for compressing the straw body 30 in cooperation with said straw feeding wheel 94.

After the knife has moved downwardly and severed an insert portion 31, it preferably dwells in such downward position and provides a confined space for the loose slidable retention of said insert. The knife blade 80 is advantageously supplied with a recess or slot 103 as shown most clearly in a reversible edge thereof 104 in said Figure 10, and as also shown in Figure 11.

In order to move the insert 31 longitudinally and rapidly from its position under the knife 80 into the partially compressed straw body 30, suitable means 105 are provided.

Said finger means or pusher elements 105 as illustrated most clearly in Figure 11, comprises an L-shaped member having a vertical leg 106 and a horizontal leg 107 as shown in said figure. Each of said finger means is pivotally mounted as on a pin 108 fixed in a bracket 109 secured to a link 110 in a sprocket chain 111. As most clearly illustrated in Figures 1, 2 and 4, said sprocket chain 111 is driven from a gear 113 keyed to the shaft 71. The sprocket chain 111 passes around idler gears 114, 115, and 116, the gears 114 and 115 being in horizontal alignment to give the sprocket chain 111 a horizontal run at 117 parallel to the insert strip 31 as it lies under the knife 80.

As viewed in Figure 11, the finger means or pusher elements and chain last referred to, travel to the right in such a manner that the bifurcate end 120 at the upper extremity of the leg 106, moves freely within the slot 103 of the knife and engages the insert 31 at its outer end 34 to move the same into the partially compressed straw body 30. The notched extension 121 at the upper extremity of the leg 106 is formed by an undercut 122 and permits the insertion of the strip 31 well into the straw and, if desired, beyond the end 35 of such straw. This degree of insertion is a matter of adjustment of the instant apparatus, as will be noted from the fact that the log 107 has a cam surface 123, slidable over the top of a block of nylon or other suitable material 124, affixedly secured to the frame 50 and extending over a substantial portion of the horizontal run 117 of said sprocket chain 111. By this means, the leg 106 is maintained in an insert-engaging posture, i.e., vertical. When, however, the chain 111 has carried the finger means 105, sufficiently to the right as shown in Figure 11, a cam surface 123 drops off the end 126 of the block 124 and at such time and in such position, the leg 106 engages a bumper such as nylon wheel 127. By this latter engagement, the leg 106 is pivoted counter-clockwise and is forced out of further disengagement with the insert 31. Thus, the positioning of the bumper 127 relative to the block 124 and particularly the end 126 thereof, as well as the positioning of the straw body 30, particularly at the end of 35, will determine the extent of insertion of the insert into the straw. Said bifurcate extension 121 of the arm 106 will, as may be observed, permit the insertion of said insert into the body of the straw beyond the end 35 of the straw. A stop 130 on the bracket 109 of the respective finger means, in cooperation with a shoulder 131 on such finger means, limits the extent of clockwise rotation of the finger means on the bracket and a shoulder 132 on such finger means also limits the extent of counter-clockwise rotation of said finger means, said directions being relative to the view of Figure 11.

As seen in Figure 10, a slot 135 is formed in the frame adjacent the knife 80 and under the insert 31. Such slot is tapered at 136 and the finger means 105 (which move to the left relative to said Figure 3) are adapted to be received in said slot 135 as they move against the insert 31 to force the insert longitudinally into the corresponding straw body 30. The slot 135 is, for the purpose of accommodating the upper end 120 of the finger piece 105, indexed to and in communication with the slot 103 in the knife 80. Such arrangement permits the finger piece or pusher element 105 to extend slightly above the insert 31 for the best pushing action against the said insert.

Reference to Figure 10 shows the leg 106 of the finger means 105 extending upwardly through said slot 135 and into the groove 103 at the bottom of the knife 80 for forcing the insert 31. As intended to be conveyer by said Figure 10, the clearance between the slot 135 and the leg 106 of the finger piece is preferably of the order of two-thousandths of an inch. The tolerances being close and the linear speed of the sprocket chain 111 being approximately 225 to 300 feet per minute under normal operation, it is necessary to stabilize and insure the accurate operation and movement of the finger piece 105, and particularly, the leg 106 thereof within the slot 135. For this purpose, as previously mentioned, a block 124 is provided. Said block will provide less give if made of steel, but as previously noted, it may be of nylon. It has been found most satisfactory to provide a nylon bumper or block to cushion the initial impact of the engagement of the leg 107 thereof, but provide a steel matrix or body portion of said block along which said leg 107 is adapted to slide. For further stabilizing said finger piece, a roller 138, preferably of nylon, is fitted to the bracket 109, as shown, the same being fitted on the pin 108 on which the finger piece 105 is pivotally secured.

Occasionally, an insert 31 will jam, ordinarily by some imperfection in the material of the feed stock 52 or in non-uniformity or blemish therein. In such event, means must be provided to stop the machine instantaneously. This has been accomplished by provision of a trip mechanism comprising a micro-switch 140 next to the frame 50 and engageable by a pin 141 secured in a hub 142 associated with the gear 113. The gear 113 is clutchingly connected to the hub 142, the latter being keyed to the shaft 71. Said clutching arrangement is by means of said pin 141 which is spring urged by means of a coil spring 145 and a collar 146, the latter being part of the pin 141. The spring is held in place by a threaded plug 147 which also slidably retains the pin 141. The gear is recessed at 148, the rounded end 149 of the pin 141 being normally urged by said spring 145 into the recess 148. Inasmuch as the gear 113 drives the sprocket chain 111 through the shaft 71, said driving force is transmitted through the hub 142 and by means of the pin end 149 in recess 148, said force is transmitted to the driven gear 113. Such being the case, it will be observed that if the gear 113 is for any reason allowed or retarded as by jamming of an insert 31 as the same is pushed into the straw body 30, the pin 141 will ride out of the recess 148 and into an extended position as indicated in dotted outline at 150 in Figure 13, where it registers with the micro-switch 140. Inasmuch as the microswitch is in series with the electrical current to the motor 67 by a circuit well-known by those skilled in the art and therefore not shown, the circuit of the motor 67 will be broken, and the machinery will be promptly brought to an effective stop. Meanwhile, it will be noted that the very act of jamming of the insert will instantaneously stop the rotation of the gear 113 even before the motor is stopped, and in fact without regard to whether the motor is ultimately stopped or not. Serious destruction of parts, inserts, and straws, is thereby obviated.

A hand wheel 152 is keyed to the shaft 66 to permit hand operation of the equipment for the purpose of checking its proper operation prior to starting of the motor 67.

It has been found in the instant apparatus that commercially available straws approximately 10 inches in length can be provided with inserts by the instant apparatus at speeds of 230 to at least 300 per minute with available material, such, for example as wax paper straws 30 and water paper type stock 52 composed of cotton linters.

This invention features the provision of a novel, commercially feasible machine for making a flavored drinking straw in an economically reproducible manner, by the insertion of flavored inserts by rapid and economical means.

This application is a division of our previously filed application, Serial Number 580,027, filed April 23, 1956, which issued as Patent No. 2,846,313, dated August 12, 1958.

Having described our invention, what we claim as new and desire to procure by Letters Patent is more particularly set forth in the appended claims.

We claim:

1. An apparatus for making a flavored drinking straw comprising means for feeding a sheet of insert stock from a source thereof, a knife for cutting said feed stock into strips for insertion into a straw, means for operating said knife, hopper means, said hopper means including metering means for moving individual straws from the hopper means to a position substantially in alignment with said knife, means synchronizing said feed means, said knife-operating means and said metering means, finger means, driving means for said finger means, said knife at least in part defining a guide for inserts to be moved therealong, said knife having a slot, said finger means being movable longitudinally in said slot for engaging an insert strip and moving it along said knife and forcing it into an aligned straw.

2. An apparatus as defined in claim 1 including rollers for engaging the edges of the sheet of insert material as it is being fed to the knife and flexing said edges from the plane of said sheet.

3. An apparatus as defined in claim 1 in which the finger means extend laterally from their driving means, and the finger means engage the ends of the strips and extend laterally across the strips.

4. An apparatus as defined in claim 1 in which the knife is mounted for reciprocation in a vertical direction and the slot therein is formed in its bottom edge.

5. An apparatus as defined in claim 4 in which the bottom edge of the knife forms the guide for the insert.

6. An apparatus as defined in claim 1, in which said driving means for said finger means includes a chain moving in an orbit and in which said finger means comprise a plurality of fingers spaced along and extending outwardly from said chain, said fingers having notches therein adapted to engage said inserts for thrusting the same individually longitudinally into respective straws.

7. An apparatus as defined in claim 1 in which said fingers have notches to engage said inserts for thrusting the inserts longitudinally into straws.

8. An apparatus as defined in claim 6, in which said orbit has a straight portion parallel to said knife and said guide means and a curved portion defining a path directed away from said knife means and said guide means whereby said outwardly-extending fingers, after having inserted a strip into a straw are swept around and out of said straight path portion.

9. An apparatus as defined in claim 8 in which the fingers are pivotally mounted on said chains.

10. An apparatus as defined in claim 9 including a fixed abutment adjacent the end of said straight orbit portion, means normally retaining said fingers in a position of outward extension from said drive means while said fingers are traveling in said straight portion of said orbit, said abutment and said means for retaining said fingers outwardly extended being positioned and arranged so that said means for maintaining said fingers in outward extension are released upon said fingers engaging against said abutment, to free said fingers from their engagement with said respective inserts.

11. An apparatus as defined in claim 10, in which the means for retaining said fingers in said position of outward extension from said chain comprises a stationary cam means extending in parallelism with said straight orbital portion, cam followers are connected to said fingers and are slidable along said stationary cam means and retain said fingers in their outwardly extending position, and said fingers engage said fixed abutment at a position along said straight portion of said orbit corresponding to an end of said stationary cam means, whereat the end of said cam followers respectively disengage said stationary cam means.

12. An apparatus as defined in claim 11, including safety release means for said chain actuatable upon the application of a predetermined retarding force to said chain.

13. Apparatus for making a flavored drinking straw comprising means for feeding a sheet of insert stock, a knife, means for actuating said knife to cut said sheet of said stock into insert strips, a hopper for a supply of straws, means for feeding straws from said hopper to a filling station with the straws in substantially longitudinal alignment with insert strips cut from a sheet of said insert stock, said knife at least in part defining a guide extending transversely of the direction of the feed of the insert sheet stock to the knife for the sliding of insert strips longitudinally therealong, said knife having a guide slot therein extending in the same direction as the guide, a pusher element mounted for movement along said guide means and having a portion positioned to extend into the guide slot in the knife, means for moving said pusher element along said guide means and the slot in the knife, and means for synchronizing said straw-feeding means, said knife-actuating means and said pusher-element moving means so that a straw is momentarily held at the filling station while the pusher element moves an insert along said guide means and into an end of the straw.

14. Apparatus for making a flavored drinking straw as defined in claim 13 having a plurality of pusher elements and an endless chain on which said pusher elements are mounted.

15. Apparatus for making a flavored drinking straw as defined in claim 14 in which the pusher elements are mounted for pivotal movement on said chain, and which includes means for engaging the pusher elements before they come in contact with an end of the straw to rock the pusher elements in a direction away from the straw.

References Cited in the file of this patent
UNITED STATES PATENTS 2,753,267     Rabin et al. _____ July 3, 1956